(12) United States Patent
Meister (10) Patent No.: US 8,793,495 B2
(45) Date of Patent: Jul. 29, 2014

(54) METHOD FOR AUTHENTICATING A PORTABLE DATA CARRIER

(75) Inventor: Gisela Meister, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 13/818,418

(22) PCT Filed: Aug. 19, 2011

(86) PCT No.: PCT/EP2011/004193
§ 371 (c)(1),
(2), (4) Date: Feb. 22, 2013

(87) PCT Pub. No.: WO2012/031681
PCT Pub. Date: Mar. 15, 2012

(65) Prior Publication Data
US 2013/0151854 A1 Jun. 13, 2013

(30) Foreign Application Priority Data
Aug. 23, 2010 (DE) .......................... 10 2010 035 098

(51) Int. Cl.
| | |
|---|---|
| *H04L 9/32* | (2006.01) |
| *G06F 7/04* | (2006.01) |
| *G06F 12/00* | (2006.01) |
| *G06F 12/14* | (2006.01) |
| *G06F 13/00* | (2006.01) |
| *G06F 17/30* | (2006.01) |
| *G11C 7/00* | (2006.01) |
| *G06Q 20/34* | (2012.01) |
| *G06K 19/07* | (2006.01) |
| *G07F 7/10* | (2006.01) |
| *H04L 29/06* | (2006.01) |
| *G06F 21/44* | (2013.01) |
| *H04L 9/08* | (2006.01) |

(52) U.S. Cl.
CPC .............. *G06F 21/44* (2013.01); *G06Q 20/341* (2013.01); *G06K 19/07* (2013.01); *H04L 2209/805* (2013.01); *G07F 7/1008* (2013.01); *H04L 63/061* (2013.01); *H04L 9/08* (2013.01); *H04L 9/0844* (2013.01); *G07F 7/10* (2013.01)
USPC ............................................ 713/171; 726/20

(58) Field of Classification Search
CPC ....... H04L 9/08; H04L 63/061; H04L 9/0844; H04L 2209/805; G06Q 20/341; G06K 19/07; G07F 7/10; G07F 7/1008
USPC .......................................................... 713/171
See application file for complete search history.

(56) References Cited

U.S. PATENT DOCUMENTS

| | | | | |
|---|---|---|---|---|
| 5,602,918 | A | * | 2/1997 | Chen et al. .................... 713/153 |
| 5,761,309 | A | * | 6/1998 | Ohashi et al. ................. 713/156 |

(Continued)

FOREIGN PATENT DOCUMENTS

| | | |
|---|---|---|
| DE | 195 27 715 A1 | 2/1997 |
| DE | 101 41 396 A1 | 3/2003 |

(Continued)

OTHER PUBLICATIONS

International Search Report in PCT/EP2011/004193, dated Apr. 19, 2012.

(Continued)

*Primary Examiner* — Carolyn B Kosowski
(74) *Attorney, Agent, or Firm* — Workman Nydegger (57) ABSTRACT

A method for authenticating a portable data carrier (10) to a terminal device employs a public key (PKG) and a secret key (SK1) of the data carrier (10) as well as a public session key ($PK_T$) and a secret session key ($SK_T$) of the terminal device. The data carrier (10) employs as a public key a public group key (PKG). As a secret key the data carrier (10) employs a key (SK1) that has been derived from a secret group key (SKG) associated with the public group key (PKG).

15 Claims, 4 Drawing Sheets

(56) References Cited

U.S. PATENT DOCUMENTS

| | | | |
|---|---|---|---|
| 5,818,738 A * | 10/1998 | Effing | 702/117 |
| 6,336,188 B2 | 1/2002 | Blake-Wilson et al. | |
| 6,725,375 B2 * | 4/2004 | Fujioka | 713/191 |
| 7,036,012 B2 * | 4/2006 | Charrin | 713/169 |
| 7,117,364 B1 * | 10/2006 | Hepper et al. | 713/176 |
| 7,124,304 B2 * | 10/2006 | Bel et al. | 713/193 |
| 7,234,058 B1 * | 6/2007 | Baugher et al. | 713/163 |
| 7,234,063 B1 * | 6/2007 | Baugher et al. | 713/189 |
| 7,395,435 B2 * | 7/2008 | Benhammou et al. | 713/185 |
| 7,409,552 B2 * | 8/2008 | Buttyan et al. | 713/172 |
| 7,706,540 B2 * | 4/2010 | Fransdonk | 380/279 |
| 7,844,831 B2 * | 11/2010 | Benhammou et al. | 713/189 |
| 7,894,601 B2 * | 2/2011 | Fontana et al. | 380/44 |
| 7,957,320 B2 * | 6/2011 | Konig et al. | 370/254 |
| 7,984,291 B2 * | 7/2011 | Eronen et al. | 713/156 |
| 7,991,697 B2 * | 8/2011 | Fransdonk | 705/51 |
| 8,316,237 B1 * | 11/2012 | Felsher et al. | 713/171 |
| 2001/0016908 A1 | 8/2001 | Blake-Wilson et al. | |
| 2002/0013884 A1 * | 1/2002 | Fujioka | 711/115 |
| 2002/0107798 A1 * | 8/2002 | Hameau et al. | 705/41 |
| 2003/0041244 A1 * | 2/2003 | Buttyan et al. | 713/172 |
| 2004/0059925 A1 * | 3/2004 | Benhammou et al. | 713/189 |
| 2006/0193474 A1 * | 8/2006 | Fransdonk | 380/279 |
| 2008/0008315 A1 * | 1/2008 | Fontana et al. | 380/44 |
| 2008/0089517 A1 * | 4/2008 | Bianco et al. | 380/259 |
| 2008/0109362 A1 * | 5/2008 | Fransdonk | 705/51 |
| 2009/0013190 A1 * | 1/2009 | Benhammou et al. | 713/185 |
| 2009/0164799 A1 * | 6/2009 | Takagi | 713/186 |
| 2010/0161992 A1 | 6/2010 | Schuetze et al. | |
| 2012/0290830 A1 * | 11/2012 | Resch et al. | 713/150 |
| 2012/0331302 A1 * | 12/2012 | Eichholz et al. | 713/182 |
| 2013/0151854 A1 * | 6/2013 | Meister | 713/171 |
| 2013/0326235 A1 * | 12/2013 | Meister | 713/189 |

FOREIGN PATENT DOCUMENTS

| | | |
|---|---|---|
| DE | 10 2008 028 701 A1 | 12/2009 |
| DE | 10 2008 055 076 A1 | 7/2010 |
| EP | 0 313 967 A1 | 5/1989 |
| EP | 1 286 494 A1 | 2/2003 |
| EP | 2 136 528 A1 | 12/2009 |
| WO | 2006/089101 A2 | 8/2006 |

OTHER PUBLICATIONS

International Preliminary Report on Patentability in PCT/EP2011/004193, dated Feb. 26, 2013.

* cited by examiner

METHOD FOR AUTHENTICATING A PORTABLE DATA CARRIER

BACKGROUND OF THE INVENTION

A. Field of the Invention

The present invention relates to a method for authenticating a portable data carrier to a terminal device, and to an accordingly adapted data carrier and a terminal device.

B. Related Art

A portable data carrier, for example in the form of an electronic identity document, comprises an integrated circuit with a processor and a memory. In the memory there are stored data relating to a user of the data carrier. On the processor there can be executed an authentication application via which the data carrier can authenticate itself to a terminal device, for example at a border control or the like in the case of an identity document.

During such an authentication method, a secure data communication between the data carrier and the terminal device is prepared by a secret communication key for symmetric encryption of a subsequent data communication being agreed on, for example by means of the known key exchange method according to Diffie and Hellman, or other suitable methods. Further, at least the terminal normally verifies the authenticity of the data carrier, for example using a certificate.

For carrying out a method for agreeing on the secret communication key, it is necessary that the terminal as well as the data carrier respectively make available a secret key and a public key. The certificate of the data carrier can relate for example to its public key.

When each data carrier of a set or group of data carriers having an individual key pair consisting of a public key and a secret key is personalized, problems result with regard to the anonymity of the user of the data carrier. It would then be possible to associate each employment of the data carrier uniquely with the corresponding user, and in this way create a complete movement profile of the user, for example.

To take account of this aspect, it has been proposed to equip a plurality or group of data carriers respectively with an identical, so-called group key pair consisting of a public group key and a secret group key. This makes it possible to restore the anonymity of a user, at least within the group. This solution is disadvantageous in that if one of the data carriers of the group is compromised, the total group of data carriers must be replaced. If the secret group key of one of the data carriers of the group has been spied out, for example, none of the data carriers of the group can be securely used further. The effort and costs of a necessary replacement campaign can be huge.

The object of the present invention is to propose an authentication method that protects the anonymity of the user and wherein the compromising of one of the data carriers has no adverse effects on the security of other data carriers.

A method according to the invention for authenticating a portable data carrier to a terminal device employs a public key and a secret key of the data carrier as well as a public session key and a secret session key of the terminal device. The data carrier employs as a public key a public group key. As a secret key the data carrier employs a secret key that is derived from a secret group key associated with the public group key.

In the method according to the invention it is no longer necessary to store the secret group key in the data carrier. Therefore, such key cannot be spied out upon an attack on the data carrier. Secret session keys of other, non-attacked data carriers of a group of data carriers can be used further.

Tracking the data carrier using a public key individual to the data carrier is not possible, because no such thing is present in the data carrier. The public key employed is the public group key which is not individual to the data carrier, but is identical for all data carriers of the group. In this regard all data carriers of a group are indistinguishable. Thus, the anonymity of the user can be maintained.

Preferably, before a further execution of the authentication method the secret key of the data carrier is respectively replaced by a secret session key of the data carrier that is derived from the secret key. That is, the data carrier executes the authentication method with a different secret key upon each execution. The secret key of the data carrier is thus configured as a secret session key of the data carrier.

A session key is always understood within the framework of the present invention to be a key that is newly determined for each "session", i.e. upon every carrying out of the authentication method here. Different session keys are normally different, i.e. the value of a session key in a first session differs from the value of the session key of a subsequent second session. It is not possible to infer a subsequently employed session key from an earlier one, or vice versa.

Therefore, it is equally impossible to track the user of the data carrier using the secret key of the data carrier. A secret key of the data carrier could also be used in another, known way, for example in a challenge-response method for authentication to a data processing device. However, since according to the present invention the secret key is a session key, i.e. has a different value upon each use, the identity of the data carrier cannot be inferred from the secret key alone. Thus, the anonymity of the user can also be maintained in this regard.

A portable data carrier according to the invention comprises a processor, a memory and a data communication interface to a terminal device, as well as an authentication device. The latter is adapted to carry out an authentication to a terminal device while employing a public key and a secret key of the data carrier as well as a public session key and a secret session key of the terminal device. The authentication device is further adapted to respectively replace the secret key of the data carrier by a secret session key of the data carrier that is derived from the secret key. In this way it is possible, as described, for each carrying out of the authentication method to be effected with a session-specific secret key of the data carrier.

A terminal device according to the invention for data communication with a portable data carrier according to the invention is adapted to carry out an authentication to a portable data carrier while employing a public key and a secret key of the data carrier as well as a public session key and a secret session key of the terminal device.

A system according to the invention comprises a data carrier according to the invention as well as a terminal device according to the invention. These are respectively adapted to carry out an authentication method according to the invention.

Within the framework of the method, a communication key is agreed on between the data carrier and the terminal device by means of the public group key and the secret key of the data carrier as well as the public session key and the secret session key of the terminal device. This communication key is then available only to these two parties. In this sense it is a secret communication key. Such a key agreement can be effected for example by means of a Diffie-Hellman key exchange method. Other, comparable methods can likewise be used. Agreeing on the communication key can be regarded as a form of implicit authentication between the data carrier and the terminal device. If a subsequent data communication encrypted by means of the agreed on communication key can be effected between the data carrier and the terminal device successfully for both sides, one party is respectively considered by the other party to be successfully authenticated.

Preferably, the public group key employed as a public key of the data carrier is verified by the terminal device by means of a certificate of the public group key. For this purpose, the corresponding certificate of the terminal device can be made available by the data carrier in suitable fashion. The data carrier can send the certificate to the terminal device for example. It is also possible to hold the certificate in a freely readable memory area of the data carrier. The step of verifying the certificate can be regarded as part of an authentication method wherein the data carrier identifies itself to the terminal device by means of the certificate. In this way the data carrier can be authenticated as a data carrier of the group that is associated with the group key pair, but not be tracked using a certificate individual to the data carrier, which certificate is not provided according to the invention. Only the certificate of the public group key, which certificate is identical for all data carriers of the group, is stored on the data carrier, thereby maintaining the anonymity of the user of the data carrier in this regard as well.

In the same way, the terminal can identify itself to the data carrier by means of a similar certificate.

Preferably, the secret key of the data carrier is derived from the secret group key while employing a first random number. For this purpose, there can be employed any suitable operation that can take up as input data—inter glia—the secret group key as well as the first random number and process them into the secret key individual to the data carrier. For example, there can be used mathematical operations, such as multiplication, exponentiation or the like. Deriving the secret key from the secret group key can be effected for example during the manufacture of the data carrier, e.g. in the personalization phase. The secret key of the data carrier is then stored in the data carrier. The public group key and the certificate relating to this key can also be incorporated into the data carrier in this phase.

The secret session key of the data carrier which respectively replaces the current secret key of the data carrier after an execution of the authentication method can be derived from the current secret key in different ways. The derivation is effected in the data carrier. Since the original secret key has been derived from the secret group key, and each session key of the data carrier is derived from the respective current secret key of the data carrier—which it then replaces—each session key of the data carrier is also derived indirectly from the secret group key. However, it is not possible to infer the secret group key from a secret session key of the data carrier.

A replacing of the secret key by the derived secret session key of the data carrier can be effected for example such that the secret key is "overwritten" by the derived session key, i.e. the secret key assumes the value of the derived session key. The preceding value of the secret key is deleted. That is, the data carrier always has the secret key that is employed in the method according to the invention. However, the value of the secret key changes between two executions of the method. The data carrier thus respectively has a session-specific secret key.

The derivation of the secret session key from the current secret key is effected on the basis of a session parameter.

According to a first embodiment, the secret session key of the data carrier can be derived from the secret key while employing a random number. That is, the random number represents the session parameter. In so doing, a new random number is respectively employed for each derivation of a session key of the data carrier. The random number can be generated in the data carrier. After the deriving, the random number is deleted. This makes it impossible to infer from the derived session key the secret key employed for the derivation.

According to an alternative embodiment, the session parameter can be determined in dependence on a value made available by the terminal device. This value can assume for example the form of a public sector key of the terminal device and be made available to the data carrier after an authentication has been effected between data carrier and terminal. This sector key is now used in the data carrier for deriving the secret session key in suitable fashion.

For deriving the secret session key of the data carrier, several session parameters can of course also be employed, i.e. for example a random number and a terminal parameter.

According to a preferred embodiment, the public group key is determined by means of exponentiation of a specified primitive root with the secret group key. The original secret key is then formed in this embodiment by multiplication of the secret group key by a first random number. Finally, a first base of the data carrier is formed by means of exponentiation of the primitive root with the reciprocal of the first random number.

A secret session key of the data carrier is then determined, if necessary, by means of multiplication of the current secret key by a session parameter. A session base is determined by the data carrier by means of exponentiation of the first base with the reciprocal of the session parameter. The computation of a session base is effected just like the computation of a secret session key for preparing a further carrying out of the authentication method. The session parameter can, as mentioned, be specified for example by a second random number or in dependence on a parameter of the terminal device. The secret key of the data carrier is then replaced by the secret session key of the data carrier in the described way. In the same way the first base is replaced by the session base, i.e. the value of the first base is replaced by the value of the session base. Thus, the first base of the data carrier can also be regarded as session-specific, like the secret key.

The first base, i.e. its current value, is made available to the terminal device by the data carrier, being for example sent thereto or held in freely readable fashion.

The terminal device then determines its public session key by means of exponentiation of the first base made available by the data carrier, with the secret session key of the terminal device. The secret session key of the terminal device is respectively generated in session-specific fashion by said device.

Finally, the terminal device sends the public session key, determined as described, to the data carrier.

Thus, the data necessary for agreeing on the communication key are exchanged between the data carrier and the terminal device. The data carrier computes the communication key for its part by means of exponentiation of the received public session key of the terminal device with its own secret key. The terminal device determines the communication key for its part by means of exponentiation of the public group key, i.e. the public key of the data carrier, with the terminal device's own secret session key.

Subsequently—or alternatively before the agreement on the communication key—the terminal device can check the public key of the data carrier, i.e. the public group key, by means of the certificate made available therefor by the data carrier, as mentioned, according to this embodiment as well.

DESCRIPTION OF THE DRAWINGS

Hereinafter the invention will be described by way of example with reference to the attached drawings. Therein are shown.

DETAILED DESCRIPTION

Figure 1:
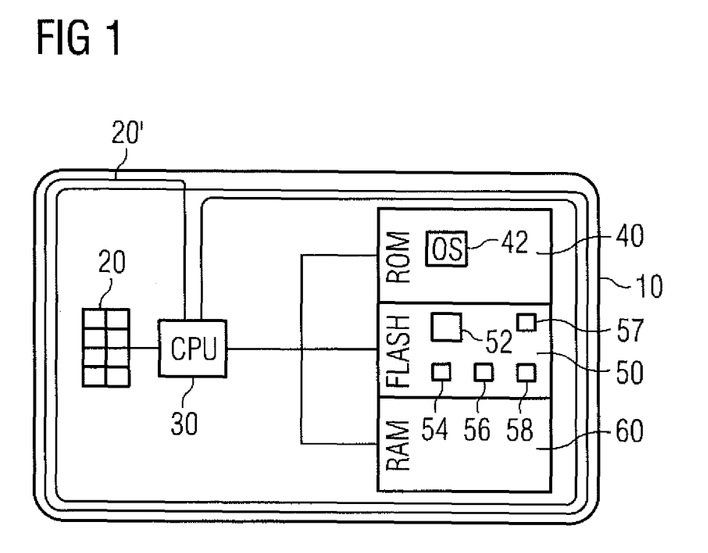
FIG. 1 schematically a preferred embodiment of a data carrier according to the invention, FIGS. 2 and 3 steps of a preferred embodiment of the method according to the invention for authenticating the data carrier from FIG. 1 to a terminal device, and FIG. 4 additional steps of the method from FIGS. 2 and 3 for making available session-specific data-carrier parameters.

With reference to FIG. 1, a data carrier 10, which is represented as a chip card here, comprises data communication interfaces 20, 20', a processor 30 as well as different memories 40, 50 and 60. The data carrier 10 can also be present in a different design.

As data communication interfaces 20, 20' the data carrier 10 comprises a contact pad 20 for contact-type data communication as well as an antenna coil 20' for contactless data communication. Alternative data communication interfaces may be provided. It is further possible that the data carrier 10 only supports one kind of data communication, i.e. only contact-type or contactless.

The non-volatile, non-rewritable ROM memory 40 comprises an operating system (OS) 42 of the data carrier 10, which controls the data carrier 10. At least parts of the operating system 42 can also be stored in the non-volatile, rewritable memory 50. The latter can be present for example as a flash memory.

The memory 50 comprises an authentication device 52 by means of which an authentication of the data carrier 10 to a terminal device can be carried out. In so doing, the keys 54, 56 likewise stored in the memory, a further value 57 as well as a digital certificate 58 find their application. The manner of functioning of the authentication device 52, the keys 54, 56, the value 57 and the certificate 58 as well as their role during an authentication method will be described more precisely with reference to FIGS. 2 and 3. The memory 50 can contain further data, for example data relating to a user.

The volatile, rewritable RAM memory 60 serves the data carrier 10 as a working memory.

The data carrier 10 can, if it is an electronic identity document for example, comprise further features (not shown). These can be applied, for example imprinted, visibly on a surface of the data carrier 10, and designate the user of the data carrier, for example by his name or a photo.

Figure 2:
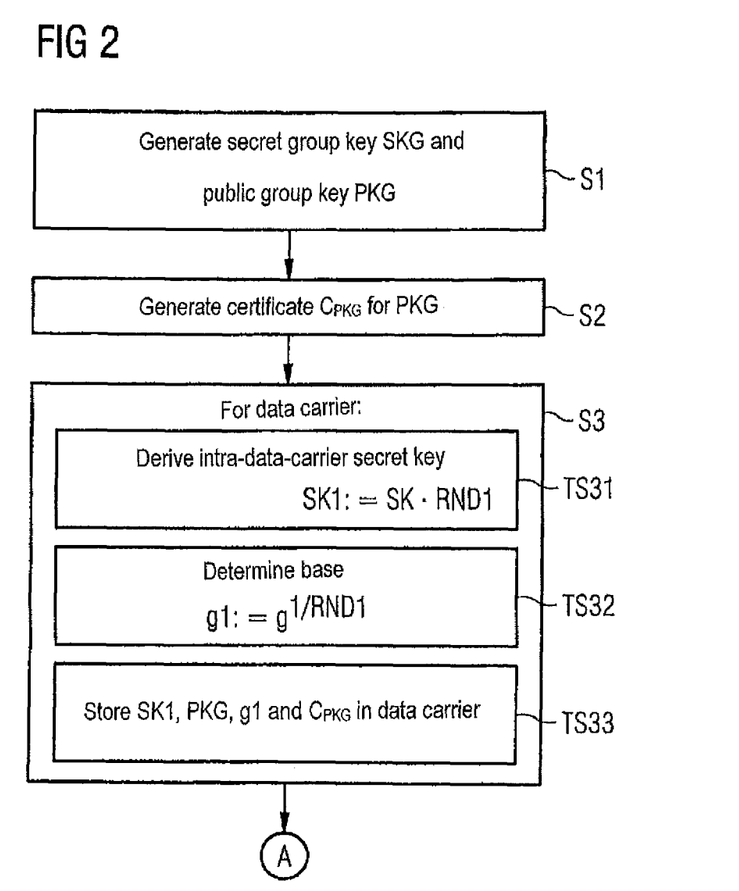
Figure 3:
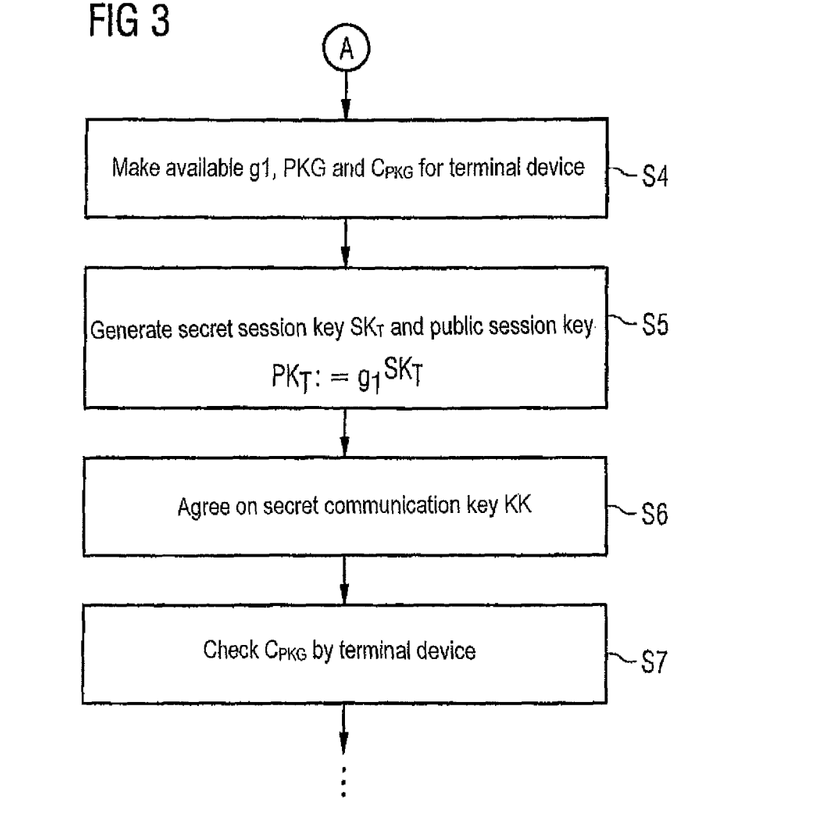

With reference to FIGS. 2 and 3, an embodiment of the method for authenticating the data carrier 10 to a terminal device will now be described more precisely. FIG. 2 shows preparatory steps. These can be carried out for example during the manufacture of the data carrier 10, for instance in a personalization phase.

In a first step S1 a secret group key SKG as well as a public group key PKG are formed. The public group key PKG is computed as the result of an exponentiation of a specified primitive root g modulo a specified prime number p. All computations described hereinafter are to be read modulo the prime number p, without this always being explicitly stated. The two keys SKG and PKG form a group key pair and make available the basis for the hereinafter described key architecture for a group of like data carriers 10.

At this point it should be noted that all computations, i.e. multiplications and exponentiations, that are presented within the framework of the present invention can be carried out not only over a group of primitive residue classes modulo p, but over an arbitrary group (understood here as a mathematical structure and not to be confused with the above-mentioned group of data carriers), for example also on the basis of elliptical curves.

In step S2 there is formed a certificate $C_{PKG}$ which serves for verification of the public group key PKG.

Step S3 takes place during the personalization of the data carrier 10. Here, the data carrier 10, which represents a data carrier of a specified group of data carriers, is equipped with a key pair. The public group key PKG serves the data carrier 10 as a public key. A secret key SK1 of the data carrier 10 is derived from the secret group key SKG in randomized fashion, i.e. employing a random number RND1. In this way each data carrier 10 of the group is equipped with a key pair that differs from a corresponding key pair of another data carrier of the group—due to the randomized component upon the key derivation—by respective different secret keys SK1. On the other hand, all data carriers 10 of the group comprise the same public key. Further, all secret keys of the group of data carriers have been derived from the same secret group key.

In substep TS31 a secret key SK1 individual to the data carrier is derived by multiplying the secret group key SKG by the random number RND1.

In a further step TS32 a first base g1 is computed, starting out from the primitive root g. In so doing, the primitive root g is exponentiated with the reciprocal of the random number RND1 which was already employed for determining the secret key: $g1:=g\hat{}(1/RND1)$. The reciprocal 1/RND1 of the random number RND1 forms here the multiplicative inverse of the random number RND1 with regard to the multiplication modulo the prime number p.

The keys SK1 and PKG are stored in the data carrier 10 together with the base g1 and the certificate $C_{PKG}$ in substep TS33. The random number RND1 is not stored in the data carrier 10. The latter is thus adapted to carry out by means of its authentication device 52 an authentication to a terminal device, as to be described more precisely with reference to FIG. 3.

In step S4 the data carrier 10 makes available to the terminal device the data necessary for mutual authentication. For agreeing on a communication key KK the terminal device requires, in the represented embodiment, the base g1 as well as the public group key PKG. For verifying the same the terminal device requires a corresponding certificate $C_{PKG}$. These parameters of the data carrier 10 can be sent by the data carrier 10 to the terminal device. It is also possible that these values are stored in a freely readable memory area of the data carrier 10 and read out by the terminal device as needed.

In step S5 the terminal device prepares the authentication. It generates for this purpose a secret session key $SK_T$. This can be done for example in randomized fashion. A public session key of the terminal device is computed by the latter by means of exponentiation of the base g1 made available by the data carrier 10, with its own secret session key:

$$PK_T := g1\hat{}SK_T.$$

Optionally the terminal device can validate g1 and/or $PK_T$, i.e. in particular check them for certain criteria. An attack on the secret session key $SK_T$ by means of cleverly chosen values for g1 can thus be recognized by the terminal, which can then abort the process or refuse further communication.

The public session key $PK_T$ is made available to the data carrier 10 by the terminal device, being sent thereto for example.

In the following step S6 the communication key KK is now concretely agreed on. The data carrier 10 computes this communication key KK by exponentiation of the public session key $PK_T$ of the terminal device with its own secret key SK1:

$$\begin{aligned}
KK_{DT} &:= PK_T{}^{SK1} \\
&= (g1\hat{\ }SK_T)\hat{\ }^{SK1} & \text{(def. of } PK_T\text{)} \\
&= ((g\hat{\ }(1/RND1)\hat{\ }^{SK_T})\hat{\ }^{SK1} & \text{(def. of g1)} \\
&= ((g\hat{\ }(1/RND1)\hat{\ }^{SK_T})\hat{\ }^{(SKG*RND1)} & \text{(def. of SK1)} \\
&= (g\hat{\ }((1/RND1)*SK_T*SKG*RND1) & \text{(transformation)} \\
&= g\hat{\ }(SK_T*SKG)
\end{aligned}$$

The terminal device computes the communication key KK by means of exponentiation of the public group key PKG with the secret session key $SK_T$ of the terminal device:

$$\begin{aligned}
KK_T &:= PKG\hat{\ }^{SK_T} \\
&= (g\hat{\ }SKG)\hat{\ }^{SK_T} & \text{(def. of PKG)} \\
&= g\hat{\ }(SK_T*SKG) & \text{(transformation)}
\end{aligned}$$

It is thus apparent that the data carrier 10 and the terminal device arrive at the same result due to the data respectively available to them.

In step S7, finally, the terminal device checks the certificate $C_{PKG}$ of the public group key PKG. This check of the certificate can alternatively also be effected before the agreeing on the communication key KK in step S6 and/or the secret session key $SK_T$ in step S5.

Thus the authentication between the data carrier 10 and the terminal device is completed.

To prevent the data carrier 10 from being able to be identified and associated uniquely with a user upon subsequent, further authentications to the same or another terminal device by means of the method described by way of example, there are made available in the data carrier 10 session-specific data-carrier parameters. This relates to the secret key SK1 as well as the base g1. The latter is, as described, transferred to the terminal device or made available thereto in a different manner within the framework of the authentication method. An unchanged base g1 individual to the data carrier could thus be employed for identifying the data carrier 10. The same applies to a secret key SK1 of the data carrier 10, if the latter were statically individual to the data carrier and were used for example within the framework of a challenge-response method.

Figure 4:
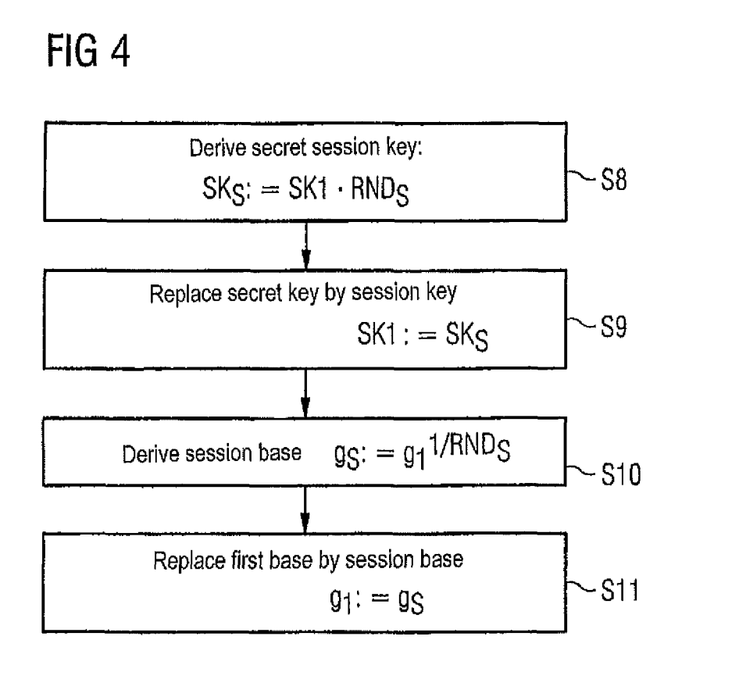

The intra-data-carrier generation of session-specific data-carrier parameters will hereinafter be described with reference to FIG. 4.

In step S8 there is shown the deriving of a secret session key $SK_S$ in the data carrier 10. For this purpose, a session parameter in the form of a random number $RNS_S$ is made available in the data carrier 10. The current secret key SK1 is multiplied by the random number $RNS_S$, thereby deriving a secret session key $SK_S$ of the data carrier 10:

$SK_S:=SK1*RNS_S$.

Subsequently, in step S9, the value of the current secret key SK1 is replaced by the value of the session key:

$SK1:=SK_S$.

Thus, the secret key SK1 of the data carrier 10 is session-specific. There can be no tracking of the data carrier 10 using the secret key SK1, because the latter changes in the described fashion between every two authentication methods carried out.

In the same way the base g1 is replaced, as shown in steps S10 and S11, by a session base $g_S$ ($g1:=g_S$) which is previously computed by exponentiating the base g1 with the reciprocal of the random number $RNS_S$: $g_S:=g1\hat{\ }(1/RNS_S)$. Thus, the base g1 of the data carrier 10 is also always session-specific and there can be no tracking of the data carrier 10 using the base g1 transferred to the terminal device. The random number $RNS_S$ is subsequently deleted. An inferring of previous session parameters is thus likewise excluded.

Instead of the random number $RNS_S$ or additionally thereto, another session parameter can also be employed. The latter can also depend on a value made available by the terminal device, for example after a successful authentication to the data carrier 10. The corresponding session parameter is computed inside the data carrier in dependence on the value made available by the terminal device. A thus computed session parameter can then be used for example instead of the random number $RNS_S$ employed in steps S8 and S10 for generating a secret session key or a session base and subsequently be deleted. Thus, the data carrier 10 possesses session-specific parameters for the next authentication method to be carried out.

According to a preferred embodiment, the terminal device makes available to the data carrier 10 a so-called public sector key $PK_{SEC}$. In dependence thereon the data carrier 10 can then compute the current session parameter as described hereinafter.

The public sector key $PK_{SEC}$ here is part of a sector key pair ($PK_{SEC}$, $SK_{SEC}$), the corresponding secret sector key $SK_{SEC}$ not being available to the terminal device itself, but only to a higher-level blocking entity to which different terminal devices in different so-called sectors are subordinate. That is, the blocking entity manages different terminal devices in different sectors, for example different administrative districts or the like. In addition to the stated sector key pair ($PK_{SEC}$, $SK_{SEC}$) the data carrier 10 can also comprise a corresponding data-carrier sector key pair ($PKD_{SEC}$, $SKD_{SEC}$) which comprises a secret data-carrier sector key $SKD_{SEC}$ and a public data-carrier sector key $SKD_{SEC}$. The latter is stored in a database which the blocking entity can access. The stated sector keys serve to make a data carrier 10 identifiable by a terminal device at least within a sector. This identification can also be used by the blocking entity for blocking purposes.

The identification of the data carrier 10 is effected using a value $I_{SEC}$ agreed on between the terminal device and the data carrier 10. This value is computed by the terminal device making available its public sector key $PK_{SEC}$ to the data carrier 10. The data carrier 10 derives a value therefrom by means of its secret data-carrier sector key $SKD_{SEC}$, for example as known from the Diffie-Hellman key exchange method. This value is then compressed by means of a hash function H and made available to the terminal device. The terminal device compares the received value $I_{SEC}$ with a corresponding value that the terminal device has received from the blocking entity. Only the blocking entity is able to compute the value $I_{SEC}$ for its part in dependence on the public data-carrier sector key $PKD_{SEC}$ stored in the database, and the secret sector key $SK_{SEC}$. The value $I_{SEC}$ is thus dependent on the sector as well as dependent on the data carrier 10. The blocking entity is in possession of all secret sector keys of the sectors subordinate thereto.

The value $I_{SEC}$ now serves within the data carrier 10 as a session parameter. That is, the computation of the secret session key $SK_S$ and the session base $g_S$ is effected analogously to steps S8 and S10 with $I_{SEC}$ instead of $RNS_S$.

It can now be provided to store the first base g1 in the data carrier 10 separately, e.g. as $g_B$. This base $g_B$ serves for checking purposes, as described hereinafter, and is not overwritten. Further, for each session i, i.e. for each carried out authentication method between the data carrier 10 and a terminal device, the public sector key $PK_{SEC;i}$ made available by the terminal device can be stored in the data carrier 10 with reference to the session, i.e. the number i of the session in the effected order. This involves only public data. There is thus no security risk if these data are spied out. According to the method these data are readable only by the blocking entity when the data carrier 10 is presented thereto for checking. Instead of the public key, the identifier of the certifying body, e.g. according to ISO/IEC 7816-4 the Issuer Identification, can also be stored.

Because the blocking entity knows the public data-carrier sector key $PKD_{SEC}$—from the database—as well as all secret sector keys $SK_{SEC;i}$ for all sectors subordinate thereto, the blocking entity is able to determine a value $I_{SEC;i}$ which has been agreed on between the data carrier 10 and a terminal device of such a sector in a session i. In this way the blocking device can compute, and thus validate, the base $g_S$ currently present in the data carrier on the basis of the values stored in the data carrier 10, i.e. the base $g_S$ as well as the public sector keys $PK_{SEC;i}$ for each session i. For this purpose it is only necessary to associate with the respective public sector key $PK_{SEC;i}$ for the session i the corresponding value $I_{SEC;i}$ for this session i and finally reconstruct the computation of the current base $g_S$ by exponentiating the value $g_B$ (original g1) with the reciprocal of the product of the values $I_{SEC;i}$ for the individual sessions:

$$g_S \cdot g_B\hat{~} = (1/(I_{SEC;i} * I_{SEC;2} * I_{SEC;3} \ldots * I_{SEC;n}).$$

In this way the blocking entity can check whether the data carrier 10 has actually employed the secret data-carrier sector key $SKD_{SEC}$ in the prescribed fashion for deriving the base $g_S$. If this were not the case, the base currently present in the data carrier would deviate from the base $g_S$ computed by the blocking entity. A forged data carrier 10 which is not in possession of the correct secret data-carrier sector key $SKD_{SEC}$ can be clearly recognized in this way by the blocking entity and subsequently blocked, where applicable.

The invention claimed is:

1. A method for authenticating a portable data carrier to a terminal device comprising:
    providing from the data carrier to the terminal device a public group key (PKG) of the data carrier and a modified base value (gl), the public group key (PKG) being derivable from a secret group key (SKG) of the data carrier using a group key base value (g), and the modified base value (gl) being derivable from the group key base value (g) using a modification value (RND1);
    providing from the terminal device to the data carrier a public session key (PKT) of the terminal device, the public session key (PKT) being derivable from a secret session key (SKT) of the terminal device using the modified base value (gl); and
    agreeing on a key agreement key (KK) between the data carrier and the terminal device using the public group key (PKG) and a secret key (SK1) of the data carrier and the public session key (PKT) and the secret session key (SKT) of the terminal device to determine the key agreement key (KK), the secret key (SK1) being derivable from the secret group key (SKG) using the modification value (RND1).

2. The method according to claim 1, wherein before a further execution of the authentication method the secret key (SK1) of the data carrier is replaced by a secret session key (SKs) of the data carrier that is derived from the secret key (SK1).

3. The method according to claim 2, wherein before a further execution of the authentication method the modified base value (gl) of the data carrier is replaced by a modified session base value (gS) derived from the modified base value (gl).

4. The method according to claim 1, wherein the key agreement key (KK) agreed on between the data carrier and the terminal device is a communication key.

5. The method according to claim 1, further comprising verifying, by the terminal device, the public group key (PKG) by means of a certificate (CPKG) of the public group key (PKG) provided to the terminal device by the data carrier.

6. The method according to claim 1, wherein the modification value (RND1) is a random number.

7. The method according to claim 1, wherein a secret session key (SKs) of the data carrier is derived from the secret key (SK1) while employing a session parameter, there being made available as a session parameter at least a second random number (RNDs) and/or a parameter of the terminal device.

8. The method according to claim 1, wherein:
    the public group key (PKG) is derivable by means of exponentiation of the group key base value (g) with the secret group key (SKG),
    the secret key (SK1) is derivable by means of multiplication of the secret group key (SKG) by the modification value (RND1), and
    the modified base value (gl) is derivable by means of an exponentiation of the group key base value (g) with the reciprocal of the modification value (RND1).

9. The method according to claim 8, wherein
    a secret session key (SKs) of the data carrier is determined by means of multiplication of the secret key (SK1) by a session parameter (RNDs), and
    a session base (gs) is formed by exponentiation of the modified base value (gl) with the reciprocal of the session parameter (RNDs), the session parameter (RNDs) being specified by a second modification value and/or a parameter of the terminal device, and the secret key (SK1) being replaced by the secret session key (SKs), and the modified base value (gl) being replaced by the session base (gs).

10. The method according to claim 8, wherein the modified base value (gl) of the terminal device is made available by the data carrier.

11. The method according to claim 10, wherein the public session key (PKT) of the terminal device is determined by means of exponentiation of the modified base value (gl) made available by the data carrier, with the secret session key (SKI) of the terminal device.

12. The method according to claim 1, wherein agreeing on a key agreement key (KK) between the data carrier and the terminal device comprises:
    calculating, by the data carrier, a first key agreement key using the secret key (SK1) of the data carrier and the public session key (PKT) of the terminal device; and
    calculating, by the terminal device, a second key agreement key using the secret session key (SKT) of the terminal device and the public group key (PKG) of the data carrier; and
    verifying that the first key agreement key is equal to the second key agreement key.

13. A portable data carrier comprising:

a memory having stored thereon a public group key (PKG), a secret key (SK1), and a modified base value (gl), the modified base value (gl) being dependent on the group key base value (g) and a modification value (RND1);

a data communication interface configured to interface with a terminal device; and a processor adapted to authenticate the data carrier to a terminal device via the data communication interface, the processor being adapted to:

provide to the terminal device the public group key (PKG) of the data carrier and the modified base value (gl);

receive from the terminal device a public session key (PKT) of the terminal device, the public session key (PKT) being derivable for a secret session key (SKT) of the terminal device using the modified base value (gl); and calculate a key agreement key (KK) using the secret key (SK1) of the data carrier and the public session key (PKT) of the terminal device, wherein the same key agreement key is calculatable using the secret session key (SKT) of the terminal device and the public group key (PKG) of the data carrier provided to the terminal device.

14. A method for authenticating a portable data carrier to a terminal device, wherein the portable data carrier has stored thereon a public group key (PKG) and a secret key (SK1), the public group key (PKG) having been determined using a group key base value (g) and a secret group key (SKG), the secret key (SK1) having been determined using the secret group key (SKG) and a modification value (RND1), and a modified base value (gl) having been determined using the group key base value (g) and the modification value (RND1), the method comprising:

by the portable data carrier, making available to the terminal device the public group key (PKG) and a factor that was used to initially derive the secret key SK1 from the secret group key (SKG); and by the terminal device, generating a secret session key (SKT), computing a public session key (PKT) based on the secret session key (SKT) and the factor used to initially derive the secret key SK1, determining a communication key (KK) using the public group key (PKG) and the secret session key (SKT), and making available to the portable data carrier the public session key (PKT);

by the portable data carrier, determining the communication key (KK) using the secret key (SK1) of the data carrier and the public session key (PKT) of the terminal device; and authenticating the portable data carrier to the terminal device using the communication key (KK).

15. The method according to claim 14, wherein the factor made available to the terminal device by the portable data carrier is the modified base value (gl).

* * * * *